United States Patent [19]

Panico

[11] 4,167,669
[45] Sep. 11, 1979

[54] APPARATUS FOR RAPID CURING OF RESINOUS MATERIALS AND METHOD

[75] Inventor: C. Richard Panico, Medford, Mass.

[73] Assignee: Xenon Corporation, Wilmington, Mass.

[21] Appl. No.: 891,079

[22] Filed: Mar. 29, 1978

Related U.S. Application Data

[60] Continuation of Ser. No. 554,743, Mar. 3, 1975, abandoned, which is a continuation-in-part of Ser. No. 383,952, Jul. 30, 1973, which is a division of Ser. No. 178,936, Sep. 9, 1971, Pat. No. 3,782,889.

[51] Int. Cl.² ................................................ G01J 1/00
[52] U.S. Cl. .................................... 250/341; 156/229; 250/504
[58] Field of Search ............... 250/341, 493, 504; 219/121 LM; 156/229

[56] References Cited

U.S. PATENT DOCUMENTS

| 2,467,661 | 4/1949 | De Ment | 250/504 |
| 2,941,934 | 6/1960 | Anspon et al. | 250/504 |
| 3,556,794 | 1/1971 | Margerum | 250/492 |
| 3,560,291 | 2/1971 | Foglia et al. | 156/229 |
| 3,662,175 | 5/1972 | Davidson et al. | 250/504 |
| 3,743,777 | 7/1973 | Dieter | 250/504 |
| 3,943,046 | 3/1976 | De Sorga et al. | 204/159.23 |
| 3,978,341 | 8/1976 | Hoell | 250/504 |

*Primary Examiner*—Harold A. Dixon
*Attorney, Agent, or Firm*—Thomas N. Tarrant

[57] ABSTRACT

Rapid curing of polymerizable materials is effected more efficiently by rapid pulsing of applied energy at a repetition rate of 3 to 120 pulses per second. Pulsed energy using fast high intensity xenon flash lamps is exemplary.

4 Claims, 4 Drawing Figures

APPARATUS FOR RAPID CURING OF RESINOUS MATERIALS AND METHOD

CROSS REFERENCES TO RELATED APPLICATIONS

This application is a continuation of my application Ser. No. 554,743 filed Mar. 3, 1975, now abandoned, which is a continuation-in-part of my application, Ser. No. 383,952 filed July 30, 1973 which is a division of Ser. No. 178,936 filed Sept. 9, 1971 entitled "Apparatus for Rapid Curing of Resinous Materials," now U.S. Pat. No. 3,782,889.

1. Field of the Invention

Present invention relates to rapid curing of resinous materials by application of energy from an external source to excite crosslinking in a polymerizable system.

Description of the Prior Art

Curing, as used herein, is the processing of a plastic or resinous material from a fluid or soft and compliant state to a permanent hard, solid and durable state. Conventionally, this is accomplished both by the elimination of solvents and by chemical changes involving interlinking of molecules commonly known as polymerization. Polymerization is the more advantageous since it does not commonly involve dimensional changes and usually produces a substantial increase in the strength of the material. Polymerization is usually caused by the addition of activating chemicals, by irradiation with some form of wave energy either electric or electromagnetic in nature, by heat or by some combination of these. One of the greater problems in polymerization is the time involved. For example, in polymerizing by the use of heat, the speed is determined largely by the intensity of the heat applied. However, it has been found that the application of high heat usually results either in the formation of inferior polymers having less complex molecules, lower density and being weak and relatively fragile, or in the complete destruction of the material. The application of low heat and different forms of wave energy results in a delayed curing process. The use of chemical activators can increase speed but it is extremely inconvenient under some conditions.

Most commonly for rapid polymerization, a resinous system contains relatively passive activators which are then activated by the application of outside energy. The amount of energy required and the time over which it must be applied are critical factors affecting production costs.

SUMMARY OF THE INVENTION

The present invention deals with both decreasing the amount of required applied energy and the time for polymerizing a thermally activatable polymer system. In accordance with the invention, energy is applied in pulses at a rate of 3 to 120 pulses per second, the pulses having a pulse width of $1 \times 10^{-3}$ to $1 \times 10^{-6}$ seconds. The exemplary apparatus for practicing the invention utilizes xenon flash lamps configured to provide 25.5% of their light output in the range of 800 to 1,000 nm wavelength. The time for polymerization of common polymerizable resins was greatly reduced as compared to continuous application of energy at a nondestructive level. Thus, it is an object of the invention to provide a novel method for rapid polymerization of resinous material. It is a further object of the invention to provide a method of polymerization by pulsed energy. It is still a further object of the invention to provide flash apparatus for rapid polymerization of resinous materials. Further objects and features of the present invention will become apparent upon reading the following description together with the drawing.

DESCRIPTION OF THE PREFERRED EMBODIMENT

A preferred embodiment of the invention uses xenon flash lamps for providing the additional energy for rapid polymerization. The particularly desirable features of such flash lamps is the ability to provide energy pulses with high rise and decay rates. The original interest in flash lamps, as indicated in the parent application, has been as ultraviolet sources. Xenon flash lamps operated with short, high density pulses are known to put out substantial radiation in the ultraviolet region. However, it has proved difficult to obtain any significant increase in the rate of polymerization by ultraviolet alone. Experiment instead led to the present surprising results. First, it was discovered that sometimes polymerization by xenon flash lamps was much faster than other times. Spectrograms showed that the higher speeds were accompanied by an increased infrared output by the flash lamps. Further experiment then showed that pulse shape and rate also had surprising influence.

Thus the method of the present invention is to polymerize thermally sensitive polymerizable resins by exposing to pulsed radiation strong in the infrared and having a rate of 3 to 120 pulses per second with a pulse width of $1 \times 10^{-3}$ to $1 \times 10^{-6}$ seconds. Preferably at least 25% of the light output is in the infrared range of 800 to 1000 nm wavelength.

Figure 1:
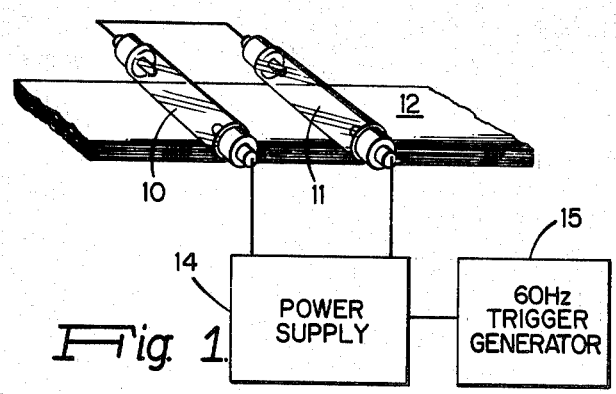
FIG. 1 is a diagrammatic illustration of a multilayer fiberous material preimpregnated with a polymerizable resin being exposed to pulsed energy from flash lamps according to the invention.

Referring to FIG. 1, two flash lamps, 10 and 11 are connected in series and positioned to irradiate multilayer fabric 12 of fibrous material saturated with thermally responsive polymerizable resins.

Figure 2:
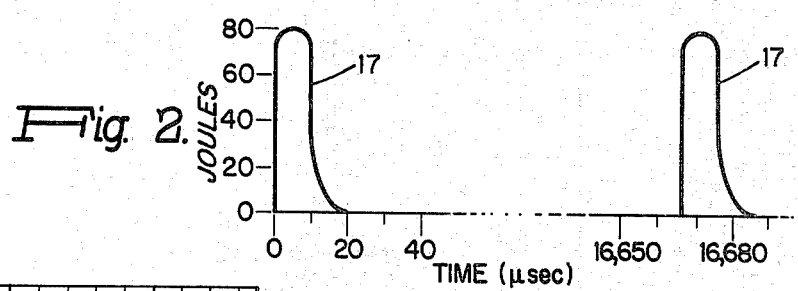
FIG. 2 is a graph of a typical pulse sequence according to the invention.

Flash lamps 10 and 11 are connected to power supply 14 which is a capacitive discharge power supply capable of providing the desired energy pulses to the flashtubes. In an exemplary situation, power supply 14 delivers 100.0 joule pulses at a rate of 60 pulses per second as depicted in FIG. 2. Trigger generator 15 provides trigger pulses to discharge power supply 14 into the flashtubes. As is well known in the flashlamp art, discharges are commonly triggered either by overvoltage of the main discharge or by high voltage triggering from a separate source. In the former, the discharge is usually held off and triggered by a silicon controlled rectifier, hydrogen thyratron or the like while in the latter the output of a pulse transformer or other low current high voltage source is used to initiate ionization in the lamp. Either system may be used with the present invention. Trigger generator 15, depicted as a separate unit, may be essentially part of power supply 14. Trigger generator 15 may have a fixed trigger rate, such as 60 Hz as shown, or any other fixed or variable rate in the range of 3 to 120 Hz.

The range of trigger rate has been determined on an empirical basis. When the rate drops below 3 Hz or goes above 120 Hz the improved efficiency from using pulsed energy is largely lost and the time for polymerization begins to approach the same time that would be required if the energy used was averaged and applied continuously at an average rate.

The shape of each pulse and the amount of energy in each pulse are determined by the parameters of the flash system, particularly the size of the discharge capacitor, the capacitor voltage, the inductance in the discharge path and the resistance in the discharge path. For efficiency, most of the resistance should be the flashtube resistance so that flashtube design in important for this purpose as well as others as will be disclosed more fully below.

FIG. 2 is a typical graph of output discharges 17 from power supply 14 through flashlamps 10 and 11. The total energy in each discharge 17 is depicted as 80 joules and will be something less than the stored energy determined by the power supply voltage and size of discharge capacitor. The power supply used for most polymerization so far uses 10 kilovolts and a 2 microfarad capacitor to give a 10 joule stored energy. This stored energy figure is that used by conventional commercial practice and it will be used hereinafter. The pulse width between the half power points is substantially 10 microseconds. The pulse repetition rate is shown as 60 Hz requiring a discontinuity in the illustration indicated by dashed portion of the base line.

While discharges 17 are 100 joules, the amount of power in each discharge has to be determined by the area of the polymerizable material to receive radiation, the effective distance between the polymerization material and the flash lamps, the type of resinous material and even unusual ambient conditions. If the energy pulses as seen by the polymerizable material are too high, destructive scorching or even fire results. If the energy pulses are too weak, the polymerization process becomes too slow.

Figure 3:
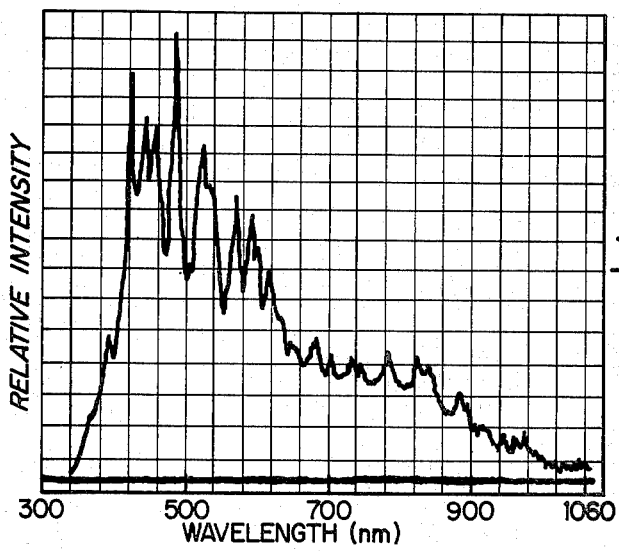
FIG. 3 is a spectrum of a usual output of a fast-pulse, high-density xenon flash lamp.
Figure 4:
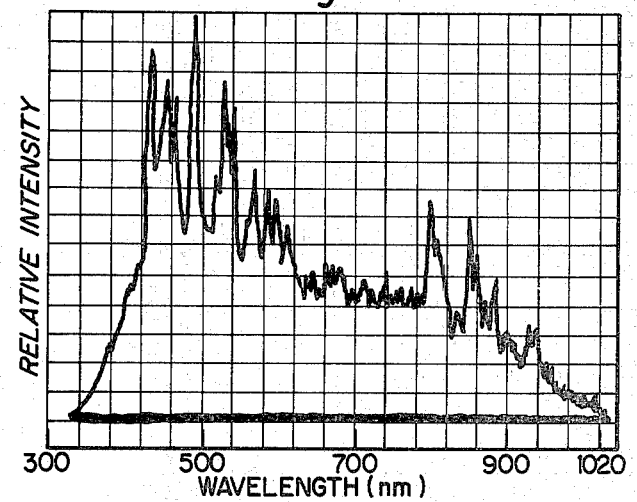
FIG. 4 is a spectrum of a xenon flash lamp in accordance with the invention.

While the circuit parameters required to produce the desired shape and power of discharge pulse are easily determined by those skilled in the art, when using flashtubes, the spectral output becomes a significant factor. FIGS. 3 and 4 are spectrums of the output of two flash lamp systems. Both spectrums were made over a range of 340 to 1100 nanometers wavelength. The spectrums FIGS. 3 and 4 show wavelength plotted against relative light intensity. It will be seen that the energy output in FIG. 4 is substantially greater than that of FIG. 3 in the 800 to 1100 nm region amounting to at least 25% of the total energy output. The gaseous mixture in a flashtube as well as the gas pressure an discharge current density are known to affect the spectral output. In any case, a spectral output of the type shown in FIG. 4 produces excellent efficiency while that of FIG. 3 does not. The present description includes one set of parameters for obtaining the spectral output of FIG. 4 from Xenon flash lamps. Many variations from these specific parameters are readily determined to obtain the same general spectral characteristics.

Following is an example of a system according to the invention and the results obtained with certain parameter variations when used to polymerize a specific material.

EXAMPLE

Power Supply:

| | |
|---|---|
| Voltage | 10 kilovolts |
| Capacitor | 2 microfarads |
| Energy per pulse | 100 joules |
| Inductance | minimum - no inductor added |
| Trigger | hydrogen thyratron |
| Trigger rate | 0 to 60 pps |

Flashtubes:

| | |
|---|---|
| Bore diameter | 3 mm |
| Arc length | 8.89 cm |
| Arc resistance | 2 ohms |
| Gas | xenon at 300 mm Hg pressure |
| Enveope | quartz |

Flash head:

Reflector assembly carrying two of above flashtubes electrically connected in series. The flashtubes are physically parallel spaced 3.8 cm on center and 1.9 cm from the open edge of the reflector. The flashtubes are positioned and the reflector is designed so that the back sides of the flashtubes (facing the reflector) are imaged adjacent to the flashtubes whereby a material being irradiated "sees" four flashtubes in parallel. The reflector width is 10.16 cm and the length is enough to encompass the length of the flashtubes. The reflector is made of polished metal.

Procedure:

The flash head was placed over a 12 layer section of "Cordopreg UVER 7581" UV-curable polyester impregnated fiberglass cloth tape from the Composites Division, Ferro Corporation, Culver City, Calif. The area of the section was approximately 50 sq. cm. The lamps were pulsed with 100 joule pulses of 10 microsecond width at a rate of 3 Hz. Polymerization was effectively complete in 60 seconds. The polymerized 12 layer section was approximately 0.3 cm thick.

The above procedure was repeated with a 60 layer section of the same material. Polymerization was effectively completed in 5 minutes. The polymerized 60 layer section was approximately 1.6 cm thick.

The above procedure was repeated with a 2 layer section. Polymerization was effectively complete in 45 seconds.

The above procedure was repeated with a two layer section with a 60 Hz. pulse rate. Polymerization was effectively complete in 10 seconds.

The above procedure was repeated with a clear liquid polymer system of Dow Chemical Co., Midland, Mich., designated DER-332. Approximately 235 ml in a container shaped from aluminum foil was placed under the flash head. Flashes as above at a 3 Hz. rate were provided for 120 seconds. The DER-332 (still liquid) was immediately purred into a ceramic cup where it became hard within 10 seconds. The resultant material was crystal clear with no sign of internal gas bubbles.

The lamps and pulses used are of the character commonly used to maximize ultraviolet output. It will be noted in FIGS. 3 and 4 that the relative intensity at the high end of the spectrum in prominent. The additional output in the infrared appears to be associated with the current density. For example, if the bore diameter of the flashtubes is increased with no increase in peak current, the additional infrared output does not appear. A further characteristic that has been noted is that when operating properly according to the invention, the temperature measured by a thermocouple adjacent to the surface of the material being irradiated rises to approximately 430° C.

It has been found that in polymer systems such as the DER-332 it has been necessary in the past to polymerize slowly over a long period of time running to many hours in order to prevent gaseous bubbles from forming in the material. The rapidity of the pulses according to the invention does not permit this "outgassing" effect to occur so that high speed cures without bubbles can now be produced in these materials. Again, with the DER-332, it was found that energy could be applied rapidly while the material remained very fluid so that it could be poured into an unheated mold where curing completed itself. An additional bonus was the finding that accurate timing of the process was possible so that high and accurate repeatability could be assured for production use.

Thus, while the invention has been described with relation to specific parameters, many variations are obvious within the scope of the inventive concept and coverage within the full scope of the appended claims is intended.

I claim:

1. A method of operating flash apparatus for polymerizing thermosettable polymer systems comprising:
   (a) placing a flashhead containing at least one flash lamp facing a polymer system to be polymerized;
   (b) driving said flash lamp with capacitive discharge pulses having a pulse width in the range of one millisecond to one microsecond and a repetition rate in the range of three to one hundred twenty pulses per second; and,
   (c) applying an energy level to said pulses such as to provide a temperature measured adjacent the surface of said polymer system of substantially 430° C., said at least one flash lamp is selected and driven to provide maximum energy peaks in the 400 to 500 nanometer wavelength region while simultaneously providing secondary peaks in the 800 to 900 nanometer wavelength region such that at least 25% of the energy output is in the 800 to 1000 nanometer wavelength region.

2. A method of operating flash apparatus according to claim 1 wherein said placing comprises placing said flashhead facing a polymer system comprising multiple layers of polyester impregnated cloth having a total thickness in the range of 0.5 millimeters to 16 millimeters.

3. A method of operating flash apparatus according to claim 1 wherein said placing comprises placing said flashhead facing a clear liquid polymer system and operating said at least one flash lamp for a time during which said polymer system is liquid then pouring said polymer system into a mold where it finishes polymerization in a few seconds without the addition of further energy.

4. A method of operating flash apparatus according to claim 1 further comprising operating said at least one flash lamp for a predetermined interval of time selected to add sufficient energy to said polymer system to effect complete polymerization.

* * * * *